United States Patent
Zetlen

(10) Patent No.: US 10,013,400 B1
(45) Date of Patent: *Jul. 3, 2018

(54) METHODS AND APPARATUS FOR IN-LINE EDITING OF WEB PAGE CONTENT WITH REDUCED DISRUPTION OF LOGICAL AND PRESENTATIONAL STRUCTURE OF CONTENT

(71) Applicant: KIBO Software, Inc., Dallas, TX (US)

(72) Inventor: James Zetlen, Austin, TX (US)

(73) Assignee: Kibo Software, Inc., Dallas, TX (US)

( * ) Notice: Subject to any disclaimer, the term of this patent is extended or adjusted under 35 U.S.C. 154(b) by 656 days.

This patent is subject to a terminal disclaimer.

(21) Appl. No.: 13/962,411

(22) Filed: Aug. 8, 2013

Related U.S. Application Data

(63) Continuation of application No. 13/632,457, filed on Oct. 1, 2012, now Pat. No. 8,522,134.

(60) Provisional application No. 61/682,584, filed on Aug. 13, 2012.

(51) Int. Cl.
G06F 3/00 (2006.01)
G06F 17/22 (2006.01)

(52) U.S. Cl.
CPC .................. *G06F 17/2247* (2013.01)

(58) Field of Classification Search
CPC .................................................. G06F 17/2247
See application file for complete search history.

(56) References Cited

U.S. PATENT DOCUMENTS

| | | | |
|---|---|---|---|
| 6,343,302 B1 | 1/2002 | Graham | |
| 6,937,234 B1 | 8/2005 | Long | |
| 7,610,219 B2 | 10/2009 | Sayed | |
| 8,370,219 B1 | 2/2013 | Prabhu et al. | |
| 9,201,851 B2 | 12/2015 | Prabhu et al. | |
| 2002/0095385 A1 | 7/2002 | McAvoy et al. | |

(Continued)

OTHER PUBLICATIONS

Anon., "Vantive Ships New Release of Front-Office Enterprise Application Suite," Business Wire, Sep. 28, 1998.

(Continued)

*Primary Examiner* — Kyle Stork

(74) *Attorney, Agent, or Firm* — Knobbe, Martens, Olson & Bear, LLP

(57) ABSTRACT

Methods and apparatus for in-line editing of web page content with reduced disruption of logical and presentational structure of content are described. In one embodiment, a rendering of a web page is presented in a what-you-see-is-what-you-get (WYSIWYG) editing environment. The presenting includes overlaying an editing control layer for accessing editing functions of the what-you-see-is-what-you-get editing environment, and an electronic commerce web page layer derived from an electronic commerce web page document. The presenting includes inserting into structural tags of the electronic commerce web page document attribute data. The attribute data identifies editing functions available from the what-you-see-is-what-you-get editing environment for elements of editable content of the electronic commerce web page document. Responsive to a control actuation in the editing control layer, code for performance on the web page document of an editing function associated with the respective element of editable content by the attribute data is executed.

22 Claims, 14 Drawing Sheets

(56) References Cited

U.S. PATENT DOCUMENTS

| | | |
|---|---|---|
| 2002/0143644 A1 | 10/2002 | Tosun et al. |
| 2002/0161733 A1 | 10/2002 | Grainger |
| 2003/0093316 A1 | 5/2003 | Wirth et al. |
| 2003/0139971 A1 | 7/2003 | Rescigno et al. |
| 2003/0163519 A1 | 8/2003 | Kegel et al. |
| 2004/0167989 A1 | 8/2004 | Kline et al. |
| 2004/0221260 A1 | 11/2004 | Martin et al. |
| 2004/0268231 A1 | 12/2004 | Tunning |
| 2005/0209928 A1 | 9/2005 | Willoughby |
| 2005/0246627 A1 | 11/2005 | Sayed |
| 2006/0129926 A1 * | 6/2006 | Malek et al. ......... G06F 17/211 715/255 |
| 2006/0031412 A1 | 9/2006 | Adams et al. |
| 2007/0078725 A1 | 4/2007 | Koszewski et al. |
| 2008/0004972 A1 | 1/2008 | Ghanma |
| 2008/0010171 A1 | 1/2008 | Ghanma |
| 2008/0209311 A1 | 8/2008 | Agronik et al. |
| 2008/0275980 A1 | 11/2008 | Hansen |
| 2009/0006454 A1 | 1/2009 | Zarzar et al. |
| 2009/0204610 A1 * | 8/2009 | Hellstrom ............... G06F 17/30 |
| 2009/0235158 A1 | 9/2009 | Rosenstein et al. |
| 2009/0307123 A1 | 12/2009 | Gershon |
| 2009/0327101 A1 | 12/2009 | Sayed |
| 2010/0005385 A1 | 1/2010 | Trabucco et al. |
| 2010/0083102 A1 | 4/2010 | Jimenez et al. |
| 2010/0107062 A1 | 4/2010 | Bacus et al. |
| 2010/0149091 A1 | 6/2010 | Kota et al. |
| 2010/0205579 A1 | 8/2010 | Zhao et al. |
| 2010/0251143 A1 | 9/2010 | Thomas et al. |
| 2011/0167334 A1 | 7/2011 | Backlund et al. |
| 2012/0084403 A1 | 4/2012 | Calvin et al. |
| 2012/0110068 A1 | 5/2012 | Emmelmann |
| 2012/0130853 A1 | 5/2012 | Petri et al. |
| 2012/0144364 A1 | 6/2012 | Lau et al. |
| 2012/0290959 A1 | 11/2012 | Quine |
| 2012/0291006 A1 | 11/2012 | Quine |
| 2016/0129926 A1 * | 5/2016 | Tonosaki ................ B61L 3/006 701/20 |

OTHER PUBLICATIONS

Anon., "SPATIALinfo: WINfirst Expands SPATIALinfo Network Inventory Management System," M2 Presswire, Jan. 14, 2002.

Anon., "Microsoft Reinvents FrontPage, Tapping into Power of XML," PR Newswire, Jun. 10, 2003.

Anon., "CurtCo Media Selects CrownPeak's Advantage CMS as Turnkey Web Publishing Solution for All Magazine Properties; Robb Report, Worth, Home Entertainment & Design Are First to Launch," Business Wire, Feb. 3, 2004.

Ernst, W., "Head to Head: Web Page Editors-Build Some Heavyweight Web Sites," Windows Magazine, No. 810, p. 141, Oct. 1, 1997.

* cited by examiner

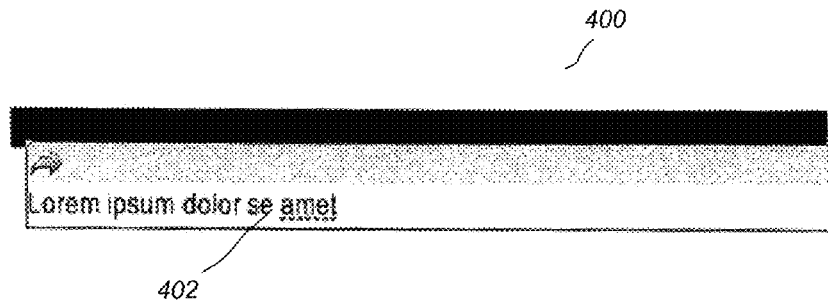

FIG. 4A

```
<div class="wysiwyg-content">
    <!-- the following is injected into the document via JS
and styled with CSS -->
    <div class="wysiwyg-content-handle" id="handle-
wysiwyg12345" style="width: 300px; height: 27px">
        <a class="wysiwyg-content-handle-icon"></a>
    </div>
    <!-- contenteditable attribute works in some browsers,
but not all; even more JS is needed to account for this -->
    <span class="wysiwyg-content-text"
contenteditable="true" id="wysiwyg12345">Lorem ipsum dolor se
amet</span>
</div>
```

FIG. 4B

```
<div data-editable="{type: 'html', name: 'content12345', id:
'12345', disallow: 'img,form'}">Lorem ipsum dolor se amet</div>
```

FIG. 4C

Present to an administrator a rendering of an electronic commerce web page in a what-you-see-is-what-you-get editing environment
510

Responsive to receiving an administrator edit of one of the elements of editable content from the what-you-see-is-what-you-get editing environment via the editing control layer, execute code for performance on the electronic commerce web page document of an editing function associated with the respective element of editable content by the attribute data
512

*FIG. 5C*

Insert into structural tags of the electronic commerce web page document attribute data such that the attribute data identifies editing functions available from the what-you-see-is-what-you-get editing environment for elements of editable content of the electronic commerce web page document
514

Render in the what-you-see-is-what-you-get environment the electronic commerce web page as viewable in presenting to a prospective purchaser
516

Overlay an editing control layer from an editing control document for accessing editing functions of the what-you-see-is-what-you-get editing environment and an electronic commerce web page layer derived from an electronic commerce web page document, such that the editing control layer is overlayed above the electronic commerce web page layer
518

*FIG. 5D*

METHODS AND APPARATUS FOR IN-LINE EDITING OF WEB PAGE CONTENT WITH REDUCED DISRUPTION OF LOGICAL AND PRESENTATIONAL STRUCTURE OF CONTENT

CLAIM OF PRIORITY

This application is a continuation of U.S. application Ser. No. 13/632,457, filed Oct. 1, 2012, which is hereby incorporated by reference herein in its entirety. This application claims benefit of priority of both U.S. application Ser. No. 13/632,457, filed Oct. 1, 2012 and U.S. Provisional Application Ser. No. 61/682,584 entitled "Methods and Apparatus for In-line Editing of Web Page Content Stored in Multiple Data Stores" filed Aug. 13, 2012, the content of which is incorporated by reference herein in its entirety and for all purposes.

BACKGROUND

Description of the Related Art

As the reach and accessibility of computer networks such as the Internet increase, the amount of information accessible via such networks has grown exponentially. For example, as commercial enterprises increasingly embrace electronic commerce techniques, numerous websites offering information and purchasing opportunities for various products and services have appeared. Major media outlets commonly provide web-based versions of content previously available only through print or broadcast channels, and in some instances generate considerable volumes of content exclusively for web-based distribution. The reduction of cost, complexity and other barriers to entry into web-based content publishing has also facilitated the generation and dissemination of content by individual creators. This phenomenon is perhaps best illustrated by the increasing number and popularity of commercial opportunities, referred to as e-commerce, which offer the ability to sell goods, services and information online.

While publishing platforms exist to enable individuals to create and manage e-commerce websites, setup and use of those platforms requires a level of sophistication that creates a significant barrier to entry for some potential users. In order to operate an e-commerce website, users must frequently be able to manipulate web page presentation data that controls the look and feel of the page, as well as business transaction data, such as prices and SKU numbers, that control the commercial aspects of the transaction offers published to consumers.

Unfortunately, HTML, the language of web pages, is not well-designed or well-suited for visual (WYSIWYG) editing. Existing WYSIWYG technologies add extra markup to the underlying, edited HTML page, in order for the web-based editor to respond predictably across browsers. This sometimes takes the form of extra <div> tags or <table> tags wrapping the area that is editable, so that complex WYSIWYG editors using <iframe> tags can be injected directly into the page. These requirements limit the types of pages that can be edited and limit the options available to frontend developers and designers. Current solutions frequently demand that an HTML page be built from the ground up with 'editability' in mind, impeding the reduction of cost, complexity and other barriers to entry into web-based content publishing that facilitates the generation and dissemination of content by individual creators, particularly in the e-commerce sector.

SUMMARY

Methods and apparatus for in-line editing of web page content with reduced disruption of logical and presentational structure of content are described. In one embodiment, a rendering of a web page is presented in a what-you-see-is-what-you-get (WYSIWYG) editing environment. The presenting includes overlaying an editing control layer from an editing control document for accessing editing functions of the what-you-see-is-what-you-get editing environment, and an electronic commerce web page layer derived from an electronic commerce web page document. The presenting includes inserting into structural tags of the electronic commerce web page document attribute data. The attribute data identifies editing functions available from the what-you-see-is-what-you-get editing environment for elements of editable content of the electronic commerce web page document. Responsive to a control actuation in the editing control layer, code for performance on the web page document of an editing function associated with the respective element of editable content by the attribute data is executed.

BRIEF DESCRIPTION OF THE DRAWINGS

FIG. 4A is an example of a web page formatted for editability.

FIG. 4B is an example of a web page content adjusted for editability using structural tags.

FIG. 4C is an example of a web page content adjusted for editability using a process for in-line editing of web page content with reduced disruption of logical and presentational structure of content, according to some embodiments.

FIG. 5C is a flowchart of a process for in-line editing of electronic commerce web page content with reduced disruption of logical and presentational structure of content, according to some embodiments.

FIG. 5D is a flowchart of operations for presenting a rendering of an electronic commerce web page in a what-you-see-is-what-you-get editing environment for in-line editing of electronic commerce web page content with reduced disruption of logical and presentational structure of content, according to some embodiments.

Figure 1:
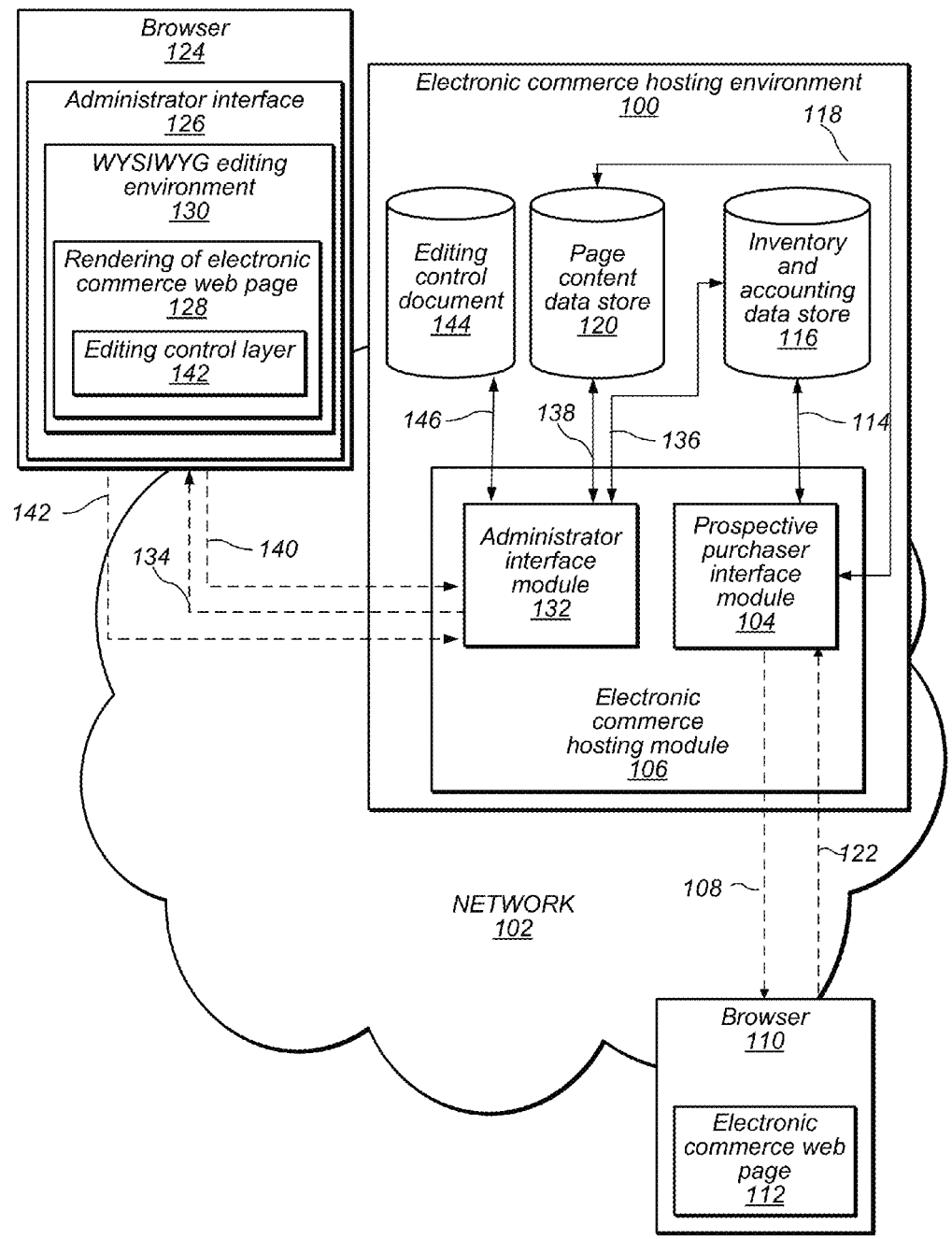
FIG. 1 illustrates an environment that may host a system for implementing in-line editing of web page content with reduced disruption of logical and presentational structure of content, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Introduction to Electronic Commerce and Editing of Electronic Commerce Web Pages Electronic commerce hosting providers include companies that help people to build and run websites for selling things over the Internet. Some electronic commerce hosting providers give users access to tools designed to speed up web page creation and maintenance and to simplify the business of running a "store" on the Internet. Embodiments, non-limiting examples of which are described herein, include tools that enable customers of electronic commerce hosting providers to edit web pages and associated business data (e.g., inventory and pricing data) using in-line (what-you-see-is-what-you-get web) editing of web page content with reduced disruption of logical and presentational structure of content through the insertion of attribute data into tags of the web page. Some embodiments further support a what-you-see-is-what-you-get web editing interface that updates both business data and web page presentation content in response to edits made on the a what-you-see-is-what-you-get web editing interface.

In order to facilitate visual editing of documents, embodiments present a rendering of a web page is presented in a what-you-see-is-what-you-get (WYSIWYG) editing environment. The presenting includes overlaying an editing control layer from an editing control document for accessing editing functions of the what-you-see-is-what-you-get editing environment, and an electronic commerce web page layer derived from an electronic commerce web page document. The presenting includes inserting into structural tags of the electronic commerce web page document attribute data. The attribute data identifies editing functions available from the what-you-see-is-what-you-get editing environment for elements of editable content of the electronic commerce web page document. Responsive to a control actuation in the editing control layer, code for performance on the web page document of an editing function associated with the respective element of editable content by the attribute data is executed.

Explanatory Notes about Technical Descriptions

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

While some processes or operations described herein are described as being performed by a particular module or modules, one of skill in the art will readily discern in light of having read the present disclosure that such operations or process may be performed by other modules or that modules and their functions may be distributed to computing systems other than those shown (e.g., executing on a client while shown herein on a server) without departing from the scope and intent of the present disclosure. Likewise, while some process are presented as a series of operations and are explained in a particular order, one of skill in the art will readily discern in light of having read the present disclosure that such operations or processes may be performed in an alternative order or combination without departing from the scope and intent of the present disclosure. Embodiments will combine, omit, and substitute modules and the operations that they perform or execute without departing from the scope and intent of the present disclosure. In the discussion contained herein, embodiments are described as performing operations or procedures, which may be taken to mean both performing an operation or procedure directly or supporting that operation or procedure through the processing or preparation of data for that operation or procedure. Likewise, as used herein, presenting data includes transmitting data or preparing data for transmission for presentation by another device.

Introduction to in-Line Editing of Web Page Content with Reduced Disruption of Logical and Presentational Structure of Content Various embodiments of methods and apparatus for in-line editing of web page content with reduced disruption of logical and presentational structure of content are presented. Some embodiments include a method for causing one or more processors to perform presenting a rendering of a web page in a what-you-see-is-what-you-get editing environment. In some embodiments, the presenting includes overlaying an editing control layer from an editing control document for accessing editing functions of the what-you-see-is-what-you-get editing environment and a web page layer derived from a web page document. In some embodiments, the editing control layer is overlayed above the web page layer. In some embodiments, the presenting includes inserting into structural tags of the web page document attribute data. In some embodiments, the attribute data identifies editing functions available from the what-you-see-is-what-you-get editing environment for elements of editable content of the web page document. Responsive to a control actuation in the editing control layer, code is executed for performance on the web page document of an editing function associated with the respective element of editable content by the attribute data.

In some embodiments, the presenting the web page document excludes inserting tags that alter structures of the web page document for use in editing in the what-you-see-is-what-you-get editing environment, and the presenting further includes rendering in the what-you-see-is-what-you-get environment the web page as viewable in presenting to a prospective purchaser. In some embodiments, the presenting further includes preparing for display in an inline frame of the editing environment what-you-see-is-what-you-get editing environment the web page document. In some embodiments, the presenting further includes preparing for display in an inline frame of the what-you-see-is-what-you-get editing environment the web page document such that a browser performing the displaying ignores the attributes as metadata.

In some embodiments, the presenting further includes executable code of the what-you-see-is-what-you-get editing environment retrieving attributes from the web page document, and displaying editing function controls of the editing control document as identified by the attributes as an overlay over an inline frame of the what-you-see-is-what-you-get editing environment. In some embodiments, the attributes are key-value metadata inserted into editable parts of the web page document. In some embodiments, the presenting does not include inserting the tags that alter structures of the web page document for use in editing in the what-you-see-is-what-you-get editing environment, and executing code for performance on the web page document of an editing function associated with the respective element of editable content by the attribute data comprises inserting tags responsive to the receiving the administrator edit of the one of the elements of editable content from the what-you-see-is-what-you-get editing environment via the editing control layer. In some embodiments, inserting the tags that alter structures of the web page document for use in editing in the what-you-see-is-what-you-get editing environment further includes inserting tags that alter the tree of the HTML content.

Some embodiments may include a means for in-line editing of web page content with reduced disruption of logical and presentational structure of content, as described herein. For example, a hosting module may present a rendering of a web page in a what-you-see-is-what-you-get editing environment. In some embodiments, the hosting module may overlay an editing control layer from an editing control document for accessing editing functions of the what-you-see-is-what-you-get editing environment and a web page layer derived from a web page document, as described herein. In some embodiments, the editing control layer is overlayed above the web page layer. In some embodiments, the hosting module may insert into structural tags of the web page document attribute data, as described herein.

In some embodiments, the attribute data identifies editing functions available from the what-you-see-is-what-you-get editing environment for elements of editable content of the web page document. Responsive to a control actuation in the editing control layer, the hosting module may execute code for performance on the web page document of an editing function associated with the respective element of editable content by the attribute data, as described herein. The hosting module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to present a rendering of a web page in a what-you-see-is-what-you-get editing environment and, responsive to a control actuation in the editing control layer, execute code for performance on the web page document of an editing function associated with the respective element of editable content by the attribute data, as described herein. Other embodiments of the hosting module may be at least partially implemented by hardware circuitry and/or firmware stored, for example, in a non-volatile memory.

Introduction to in-Line Editing of Electronic Commerce Web Page Content with Reduced Disruption of Logical and Presentational Structure of Content Various embodiments of methods and apparatus for in-line editing of electronic commerce web page content with reduced disruption of logical and presentational structure of content are presented. Some embodiments include a method for causing one or more processors to perform presenting to an administrator a rendering of an electronic commerce web page in a what-you-see-is-what-you-get editing environment. In some embodiments, the presenting to the administrator the rendering includes overlaying an editing control layer from an editing control document for accessing editing functions of the what-you-see-is-what-you-get editing environment and an electronic commerce web page layer derived from an electronic commerce web page document. In some embodiments, the editing control layer is overlayed above the electronic commerce web page layer. In some embodiments, the presenting includes inserting into structural tags of the electronic commerce web page document attribute data.

In some embodiments, the attribute data identifies editing functions available from the what-you-see-is-what-you-get editing environment for elements of editable content of the electronic commerce web page document. In some embodiments, the presenting the electronic commerce web page document excludes inserting tags that alter structures of the electronic commerce web page document for use in editing in the what-you-see-is-what-you-get editing environment. In some embodiments, the presenting further includes rendering in the what-you-see-is-what-you-get environment the electronic commerce web page as viewable in presenting to a prospective purchaser. Responsive to receiving an administrator edit of one of the elements of editable content from the what-you-see-is-what-you-get editing environment via the editing control layer, some embodiments execute code for performance on the electronic commerce web page document of an editing function associated with the respective element of editable content by the attribute data.

In some embodiments, the presenting further includes preparing for display in an inline frame of the what-you-see-is-what-you-get editing environment the electronic commerce web page document. In some embodiments, the presenting further includes preparing for display in an inline frame of the what-you-see-is-what-you-get editing environment the electronic commerce web page document such that a browser performing the displaying ignores the attributes as metadata. In some embodiments, the presenting further includes executable code of the what-you-see-is-what-you-get editing environment retrieving attributes from the electronic commerce web page document, and displaying editing function controls of the editing control document as identified by the attributes as an overlay over an inline frame of the what-you-see-is-what-you-get editing environment. In some embodiments, the attributes are key-value metadata inserted into editable parts of the document. In some embodiments, inserting the tags that alter structures of the electronic commerce web page document for use in editing in the what-you-see-is-what-you-get editing environment does not include inserting tags responsive to the receiving the administrator edit of the one of the elements of editable content from the what-you-see-is-what-you-get editing environment via the editing control layer. In some embodiments, inserting the tags that alter structures of the electronic commerce web page document for use in editing in the what-you-see-is-what-you-get editing environment further includes inserting tags that alter the tree of the HTML content.

Some embodiments may include a means for in-line editing of electronic commerce web page content with reduced disruption of logical and presentational structure of content. For example, a hosting module may perform presenting to an administrator a rendering of an electronic commerce web page in a what-you-see-is-what-you-get editing environment, as described herein. In some embodiments, the presenting to the administrator the rendering includes overlaying an editing control layer from an editing control document for accessing editing functions of the what-you-see-is-what-you-get editing environment, and an electronic commerce web page layer derived from an electronic commerce web page document, as described herein. In some embodiments, the editing control layer is overlayed above the electronic commerce web page layer, as described herein. In some embodiments, the presenting includes inserting into structural tags of the electronic commerce web page document attribute data, as described herein. In some embodiments, responsive to receiving an administrator edit of one of the elements of editable content from the what-you-see-is-what-you-get editing environment via the editing control layer, the hosting module executes code for performance on the electronic commerce web page document of an editing function associated with the respective element of editable content by the attribute data.

The hosting module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform presenting to an administrator a rendering of an electronic commerce web page in a what-you-see-is-what-you-get editing environment, and responsive to receiving an administrator edit of one of the elements of editable content from the what-you-see-is-what-you-get editing environment via the editing control layer, executing code for performance on the electronic commerce web page document of an editing function associated with the respective element of editable content by the attribute data, as described herein. Other embodiments of the electronic commerce hosting module may be at least partially implemented by hardware circuitry and/or firmware stored, for example, in a non-volatile memory.

Introduction to in-Line Editing of Web Page Content Stored in Multiple Data Stores Various embodiments of methods and apparatus for in-line editing of web page content stored in multiple data stores are presented, the functions of which may be combined with the functions of embodiments for methods and apparatus for in-line editing of web page content with reduced disruption of logical and presentational structure of content described herein. Some embodiments include a method for causing one or more processors to perform presenting a rendering of a web page in a what-you-see-is-what-you-get editing environment, and responsive to receiving from the what-you-see-is-what-you-get editing environment an edit of an element of editable content of the web page, updating in both a transaction data store and the rendering the element of editable content of the web page. In some embodiments, a what-you-see-is-what-you-get editing environment is an environment in which content (text and graphics) displayed onscreen during editing appears in a form closely corresponding to its appearance when published or displayed as a finished product. A what-you-see-is-what-you-get editing environment seeks to enable an editing user to see what the end user or customer will see in the finished web page, as opposed to a form dominated by a back-end interface for entering data or the display of codes and tags that show the machine language codes (e.g., HTML) presented for translation by a browser application.

In some embodiments, the presenting includes combining transaction data from a transaction data store and web page presentation data from a page content data store. In some embodiments, the presenting includes rendering in the what-you-see-is-what-you-get editing environment the web page as the web page would be viewed in a non-editing viewing environment in a browser. In some embodiments, the combining includes associating a set of elements of editable content of the web page with data editing tags describing storage locations for the plurality of elements of the editable content as transaction data in the transaction data store and associating a plurality of other elements of editable content of the web page with other data editing tags describing storage locations for the plurality of other elements of the editable content as web page presentation data in the page content data store.

Some embodiments include causing the one or more processors to perform, responsive to receiving from the what-you-see-is-what-you-get editing environment an edit of another element of editable content of the web page, updating in both the page content data store and the rendering the other element of editable content of the web page. In some embodiments, the receiving from the what-you-see-is-what-you-get editing environment the edit of the element of editable content of the web page includes receiving a single editing instruction from the what-you-see-is-what-you-get editing environment, and the updating in both the transaction data store and the rendering the element of editable content of the web page further includes updating in both the transaction data store and the rendering the element of editable content of the web page in response to the single editing instruction without subsequent instruction to perform updating in both the inventory and accounting data store and the rendering. In some such embodiments, a single instruction triggers in the editing environment both updates.

In some embodiments, the rendering in the what-you-see-is-what-you-get editing environment the web page as the web page would be viewed in the non-editing viewing environment in the browser further includes simulating an expected rendering by a selected browser application. In some embodiments, the presenting the rendering of the web page in the what-you-see-is-what-you-get editing environment further includes transmitting to a browser application the rendering of the web page in the what-you-see-is-what-you-get editing environment as an editing code layer for providing editing functions of the what-you-see-is-what-you-get editing environment, and an electronic commerce web page layer including attribute tags and excluding executable code for the what-you-see-is-what-you-get editing environment.

Some embodiments may include a means for in-line editing of web page content stored in multiple data stores. For example, a hosting module may present a rendering of a web page in a what-you-see-is-what-you-get editing environment, and responsive to receiving from the what-you-see-is-what-you-get editing environment an edit of an element of editable content of the web page, update in both transaction data store and the rendering the element of editable content of the web page, as described herein. The hosting module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform presenting a rendering of a web page in a what-you-see-is-what-you-get editing environment, and responsive to receiving from the what-you-see-is-what-you-get editing environment an edit of an element of editable content of the web page, updating in both the transaction data store and the rendering the element of editable content of the web page, as described herein. Other embodiments of the electronic commerce hosting module may be at least partially implemented by hardware circuitry and/or firmware stored, for example, in a non-volatile memory.

Introduction to in-Line Editing of Electronic Commerce Web Page Content Stored in Multiple Data Stores Various embodiments of methods and apparatus for in-line editing of electronic commerce web page content stored in multiple data stores are presented, the functions of which may be combined with the functions of embodiments for methods and apparatus for in-line editing of web page content with reduced disruption of logical and presentational structure of content described herein. Some embodiments include a method for causing one or more processors to perform presenting to an administrator a rendering of an electronic commerce web page in a what-you-see-is-what-you-get editing environment, responsive to receiving an administrator edit of one of a plurality of elements of editable content from the what-you-see-is-what-you-get editing environment, updating in both an inventory and accounting data store and the rendering one of a set of elements of editable content of the electronic commerce web page, and responsive to receiving another administrator edit of one of the other elements of editable content from the what-you-see-is-what-you-get editing environment, updating in both a page content data store and the rendering the one of the other elements of editable content of the electronic commerce web page.

In some embodiments, the presenting to the administrator the rendering includes combining, using a presentation layer, business transaction data from the inventory and accounting data store, and web page presentation data from the page content data store. In some embodiments, the presenting to the administrator the rendering further includes rendering in the what-you-see-is-what-you-get environment the electronic commerce web page as viewable in presenting to a prospective purchaser. In some embodiments, the combining includes the presentation layer associating elements of editable content of the electronic commerce web page with data editing tags describing storage locations for the elements of the editable content as business transaction data in the inventory and accounting data store, and associating other elements of editable content of the electronic commerce web page with data editing tags describing storage locations for the other elements of the editable content as web page presentation data in the page content data store.

In some embodiments, the web page presentation data from the page content data store includes details of the visual layout of the electronic commerce web page, and the business transaction data from the inventory and accounting data store includes transaction details with respect to products available for purchase. In some embodiments, receiving an administrator edit of one of the elements of editable content from the what-you-see-is-what-you-get editing environment includes receiving a single editing instruction from the what-you-see-is-what-you-get editing environment. In some embodiments, updating in both the inventory and accounting data store and the rendering one of the elements of editable content of the electronic commerce web page further includes updating in both the inventory and accounting data store and the rendering one of the elements of editable content of the electronic commerce web page in response to the single editing instruction without subsequent instruction to perform updating in both the inventory and accounting data store. In some such embodiments, a single instruction triggers in the editing environment both updates.

In some embodiments, the rendering in the what-you-see-is-what-you-get environment the electronic commerce web page as viewable in presenting to a purchaser further includes simulating an expected rendering to the prospective purchaser of the electronic commerce web page by a selected browser application. In some embodiments, the presenting to the administrator the rendering of the electronic commerce web page in the what-you-see-is-what-you-get editing environment further includes transmitting to a browser application of the administrator the rendering of the electronic commerce web page in the what-you-see-is-what-you-get editing environment for display of the rendering of the electronic commerce web page in the what-you-see-is-what-you-get editing environment by the browser application of the administrator.

In some embodiments, the presenting to the administrator the rendering of the electronic commerce web page in the what-you-see-is-what-you-get editing environment further includes transmitting to a browser application of the administrator the rendering of the electronic commerce web page in the what-you-see-is-what-you-get editing environment as an editing code layer for providing editing functions of the what-you-see-is-what-you-get editing environment, and an electronic commerce web page layer including attribute tags and excluding executable code for the what-you-see-is-what-you-get editing environment.

Some embodiments include causing the one or more processors to perform transmitting to the prospective purchaser of goods the electronic commerce web page. In some embodiments, the transmitting to the prospective purchaser of goods the electronic commerce web page includes transmitting the business transaction data from the inventory and accounting data store, and the web page presentation data from the page content data store. Some embodiments include causing the one or more processors to perform, responsive to the prospective purchaser issuing a transaction instruction through the electronic commerce web page, receiving a transaction order based at least in part on an entry of business transaction data in the inventory and accounting data store.

Some embodiments include causing the one or more processors to perform creating the electronic commerce web page in an electronic commerce hosting environment in response to a request from the administrator. In some embodiments, the what-you-see-is-what-you-get editing environment is a component of an administrator interface of the electronic commerce hosting environment, and the electronic commerce web page is a prospective purchaser interface for performing electronic commerce transactions using the electronic commerce hosting environment.

Some embodiments may include a means for in-line editing of web page content stored in multiple data stores. For example, an electronic commerce hosting module may present to an administrator a rendering of an electronic commerce web page in a what-you-see-is-what-you-get editing environment, responsive to receiving an administrator edit of one of the elements of editable content from the what-you-see-is-what-you-get editing environment, update in both the inventory and accounting data store and the rendering one of the elements of editable content of the electronic commerce web page, and responsive to receiving another administrator edit of one of the other elements of editable content from the what-you-see-is-what-you-get editing environment, update in both the page content data store and the rendering the one of the other elements of editable content of the electronic commerce web page, as described herein.

The electronic commerce hosting module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform presenting to an administrator a rendering of an electronic commerce web page in a what-you-see-is-what-you-get editing environment, responsive to receiving an administrator edit of one of the elements of editable content from the what-you-see-is-what-you-get editing environment, updating in both the inventory and accounting data store and the rendering one of the elements of editable content of the electronic commerce web page, and responsive to receiving another administrator edit of one of the other elements of editable content from the what-you-see-is-what-you-get editing environment, updating in both the page content data store and the rendering the one of the other elements of editable content of the electronic commerce web page, as described herein. Other embodiments of the electronic commerce hosting module may be at least partially implemented by hardware circuitry and/or firmware stored, for example, in a non-volatile memory.

Example Implementations

FIG. 1 illustrates an environment that may host a system for implementing in-line editing of web page content with reduced disruption of logical and presentational structure of content, according to some embodiments. An electronic commerce hosting environment 100 provides services to users over a network 102, such as the Internet. In one embodiment, a prospective purchaser interface module 104 of an electronic commerce hosting module 106 transmits presentation data 108 across network 102 to enable browser 110 to present an electronic commerce web page 112. Presentation data 108 includes business transaction data 114 from an inventory and accounting data store 116, and web page presentation data 118 from a page content data store 120. In some embodiments, presentation data 108 includes an electronic commerce web page document or other web page document. In some embodiments, the electronic commerce web page document or other web page document includes business transaction data 114 from an inventory and accounting data store 116, and web page presentation data 118 from a page content data store 120, as shown in FIG. 1. In other embodiments, presentation data 108 includes an electronic commerce web page document or other web page document that is stored in a single data store (not shown). A user of browser 110 sends transaction orders 122 to prospective purchaser interface module 104.

In order to create and maintain electronic commerce web page 112 and to process transaction orders 122, a user of browser 124 interacts with electronic commerce hosting module 106 using administrator interface 126. Electronic commerce hosting module 106 presents through administrator interface 126 a rendering of an electronic commerce web page 128 in a what-you-see-is-what-you-get editing environment 130. In presenting rendering of an electronic commerce web page 128 in a what-you-see-is-what-you-get editing environment 130, administrator interface module 132 transmits to browser 124 a rendering of the electronic commerce web page in the what-you-see-is-what-you-get editing environment 134 for display of the rendering of the electronic commerce web page 128 in the what-you-see-is-what-you-get editing environment 130 by browser 124, as well as transmitting an editing control layer 142 for performing editing operations on the electronic commerce web page document represented by the rendering of the electronic commerce web page 128.

The editing control layer 142 derived from the editing control document 144 for accessing editing functions of the what-you-see-is-what-you-get editing environment 130 is overlayed with the electronic commerce web page layer (rendering of electronic commerce web page 128) derived from an electronic commerce web page document. In some embodiments, the editing control layer 142 is overlayed above the electronic commerce web page layer (rendering of electronic commerce web page 128). In some embodiments, the presenting includes inserting into structural tags of the electronic commerce web page document attribute data, which may be stored in page content data store 120.

In some embodiments, the attribute data identifies editing functions available from the what-you-see-is-what-you-get editing environment 130 for elements of editable content of the electronic commerce web page document (rendering of electronic commerce web page 128). In some embodiments, tags that alter structures of the electronic commerce web page document are not inserted into the electronic commerce web page document for use in editing in the what-you-see-is-what-you-get editing environment 128, either in content of page content data store 120 or content of inventory and accounting data store 116. In some embodiments, the electronic commerce web page document is rendered (in rendering of electronic commerce web page 128) as viewable in presenting to a prospective purchaser through browser 110. Responsive to receiving an administrator edit 140 of one of the elements of editable content from the what-you-see-is-what-you-get editing environment 130 via the editing control layer 142, some code is executed in administrator interface module 132 for performance on the electronic commerce web page document of an editing function associated with the respective element of editable content by the attribute data.

In some embodiments, rendering of electronic commerce web page 128 is displayed in an inline frame of the what-you-see-is-what-you-get editing environment 130. In some embodiments, rendering of electronic commerce web page 128 is displayed in an inline frame of the what-you-see-is-what-you-get editing environment 130 such that a browser 124 performing the displaying ignores the attributes as metadata. Executable code of the what-you-see-is-what-you-get editing environment 130 retrieves attributes from the electronic commerce web page document (e.g. business transaction data 114 from an inventory and accounting data store 116, and web page presentation data 118 from a page content data store 120 or electronic commerce web page document or other web page document is stored in a single data store), and displays editing function controls of the editing control document 144 as identified by the attributes as an overlay (editing control layer 142) over an inline frame of the what-you-see-is-what-you-get editing environment 130. In some embodiments, the attributes are key-value metadata inserted into editable parts of the document. In some embodiments, inserting the tags that alter structures of the electronic commerce web page document for use in editing in the what-you-see-is-what-you-get editing environment 130 does not include inserting tags responsive to the receiving the administrator edit of the one of the elements of editable content from the what-you-see-is-what-you-get editing environment 130 via the editing control layer 142. In some embodiments, inserting the tags that alter structures of the electronic commerce web page document for use in editing in the what-you-see-is-what-you-get editing environment further includes inserting tags that alter the tree of the HTML content.

In some embodiments, administrator interface module 120 combines business transaction data 136 from inventory and accounting data store 116 and web page presentation data 138 from page content data store 120 for transmission as a part of rendering of the electronic commerce web page in the what-you-see-is-what-you-get editing environment 134. A user makes edits 140 of one of the elements of editable content from the what-you-see-is-what-you-get editing environment 130, which administrator interface 126 transmits to administrator interface module 132. Responsive to receiving an administrator edit 140 of one of the elements of editable content from the what-you-see-is-what-you-get editing environment 130, administrator interface module updates both data 136 in the inventory and accounting data store 116 and one of the elements of editable content of the rendering of the electronic commerce web page 128. Responsive to receiving another administrator edit 142 of one of the other elements of editable content from the what-you-see-is-what-you-get editing environment 130, administrator interface module 132 updates both data 138 in the page content data store 120 and the rendering one of the other elements of editable content of the electronic commerce web page 128.

Figure 2:
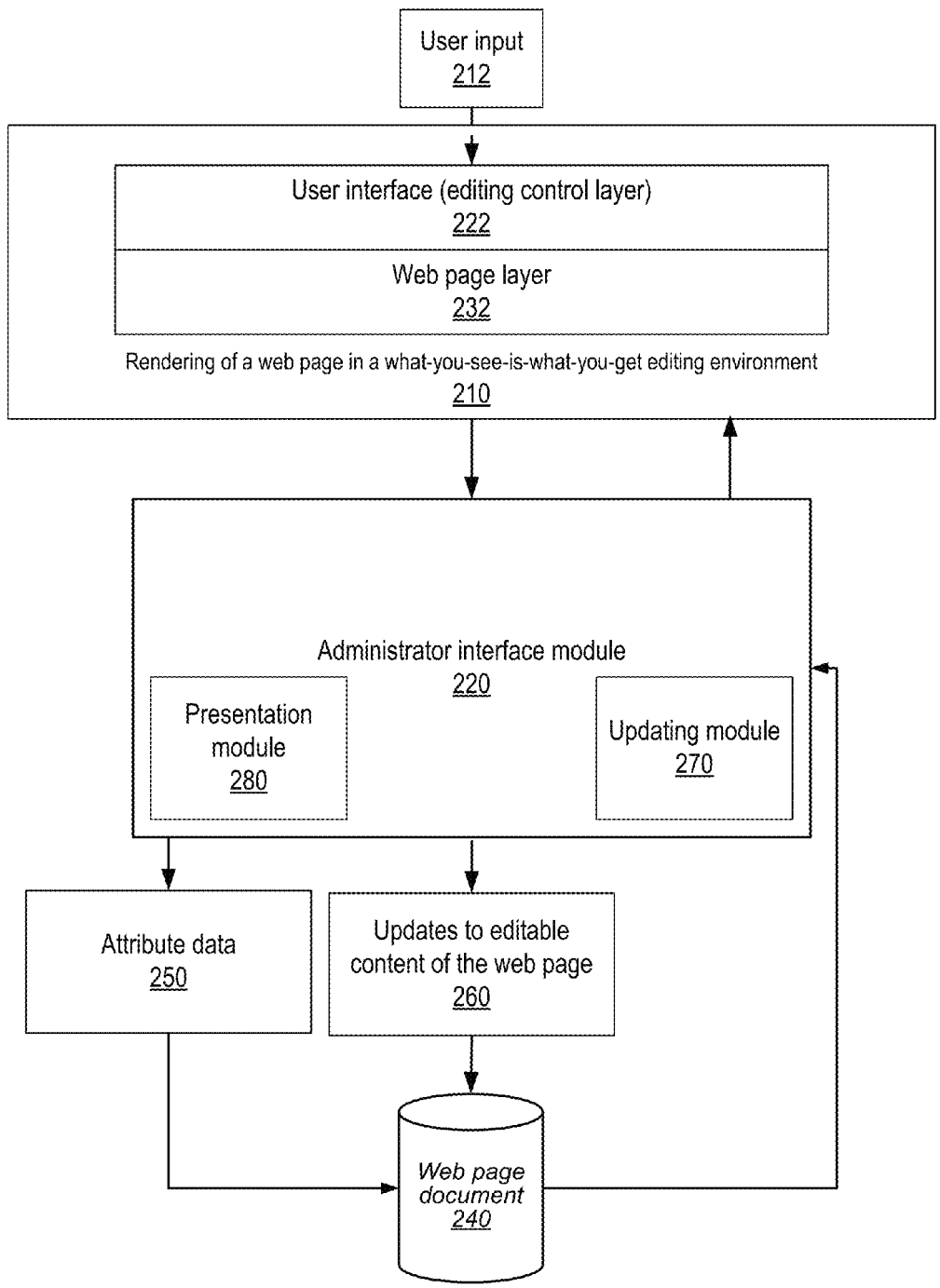
FIG. 2 depicts a module that may implement in-line editing of web page content with reduced disruption of logical and presentational structure of content, according to some embodiments.

FIG. 2 depicts a module that may implement in-line editing of web page content with reduced disruption of logical and presentational structure of content, according to some embodiments, which may implement one or more of the in-line editing techniques and tools illustrated in FIGS. 4 through 10 or described elsewhere herein. Administrator interface module 220 may, for example, implement one or more of an in-line editing tool, a what-you-see-is-what-you-get editing tool, a rendering tool, an associating tool, and a combining tool, performing functions as described herein. FIG. 11 illustrates an example computer system on which embodiments of administrator interface module 220 may be implemented. Administrator interface module 220 receives as input a web page document 240.

Administrator interface module 220 may receive user input 212 activating an in-line editing tool. Administrator interface module 220 then edits a rendering of a web page in a what-you-see-is-what-you-get editing environment 210, according to user input 212 received via user interface 222, using the activated in-line editing tool. Administrator interface module 220 generates as output updates to editable content of the webpage 260 and attributes 250, which are recorded in web page document 240. The updates are likewise made to rendering of the web page in a what-you-see-is-what-you-get editing environment 210. Web page document 240 may, for example, be stored to a storage medium, such as system memory, a disk drive, DVD, CD, etc.

Administrator interface module 220 presents, using a presentation module 280, a rendering of a web page in a what-you-see-is-what-you-get editing environment 210. In some embodiments, the presenting includes overlaying an editing control layer 222 from an editing control document for accessing editing functions of the what-you-see-is-what-you-get editing environment 210, and a web page layer derived from a web page document 240. In some embodiments, the editing control layer 222 is overlayed above the web page layer 232. In some embodiments, the presenting includes updating module 280 inserting into structural tags of the web page document 240 attribute data 250. In some embodiments, the attribute data 250 identifies editing functions available from the what-you-see-is-what-you-get editing environment 210 for elements of editable content of the web page document 240. Responsive to a control actuation in the editing control layer 222, code is executed for performance on the web page document 240 of an editing function by updating module 270 associated with the respective element of editable content by the attribute data 250.

In some embodiments, the presenting the web page document 240 excludes inserting tags that alter structures of the web page document 240 for use in editing in the what-you-see-is-what-you-get editing environment 210, and the presenting further includes rendering in the what-you-see-is-what-you-get environment 210 the web page document 240 as viewable in presenting to a prospective purchaser. In some embodiments, the presenting further includes presentation module 280 preparing for display in an inline frame of the what-you-see-is-what-you-get editing environment 210 the web page document 240. In some embodiments, the presenting further includes presentation module 280 preparing for display in an inline frame of the what-you-see-is-what-you-get editing environment 210 the web page document 240 such that a browser performing the displaying ignores the attributes as metadata.

In some embodiments, the presenting further includes executable code of the what-you-see-is-what-you-get editing environment 210 retrieving attributes from the web page document 240, and displaying editing function controls of the editing control document as identified by the attributes as an overlay 222 over an inline frame of the what-you-see-is-what-you-get editing environment 210. In some embodiments, the attributes are key-value metadata inserted into editable parts of the web page document 240. In some embodiments, the presenting does not include inserting the tags that alter structures of the web page document 240 for use in editing in the what-you-see-is-what-you-get editing environment 210, and executing code for performance on the web page document of an editing function associated with the respective element of editable content by the attribute data 250 includes inserting tags responsive to the receiving the administrator edit 212 of the one of the elements of editable content from the what-you-see-is-what-you-get editing environment via the editing control layer 222. In some embodiments, inserting the tags that alter structures of the web page document for use in editing in the what-you-see-is-what-you-get editing environment 210 further includes inserting tags that alter the tree of the HTML content.

Figure 3:
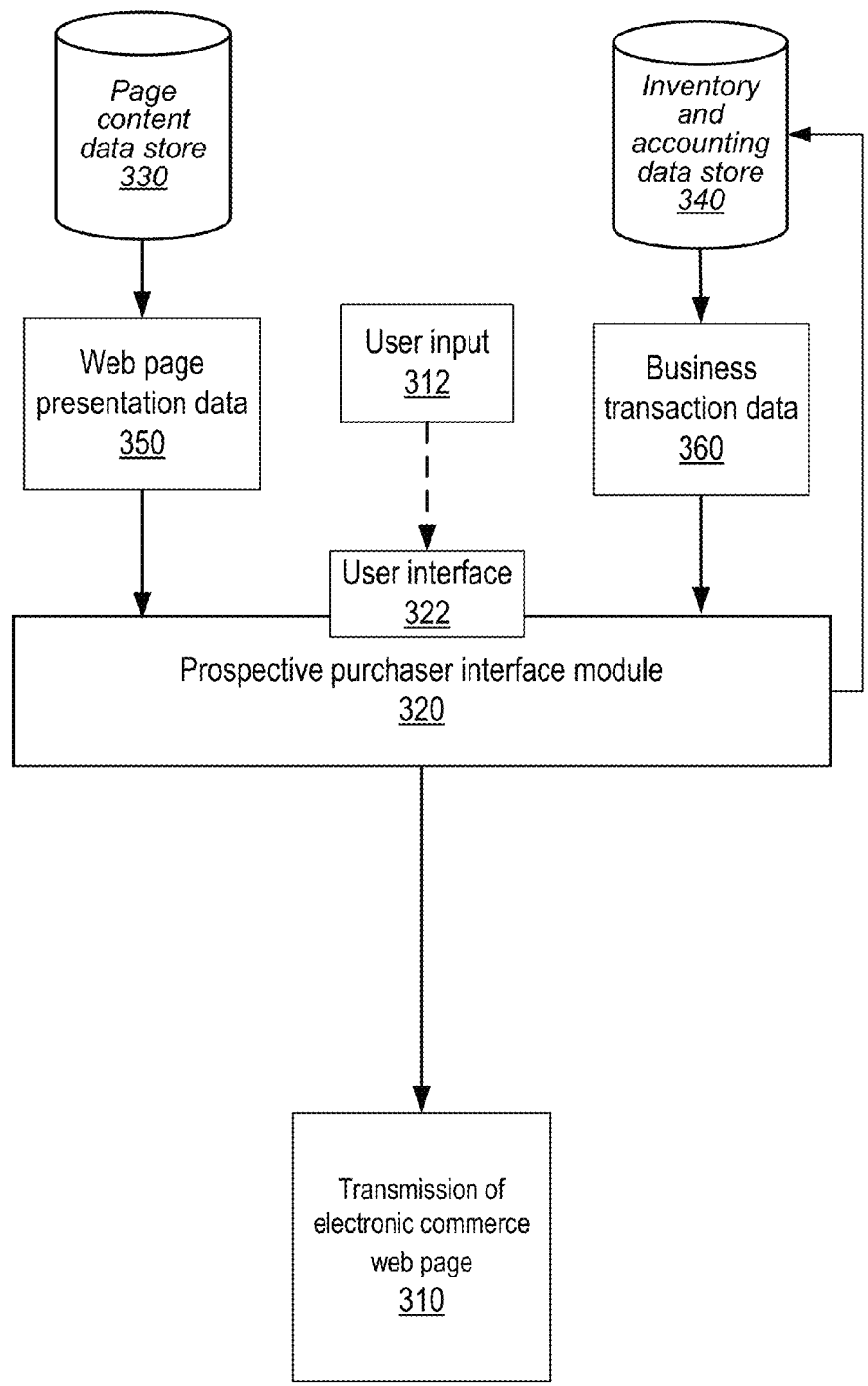
FIG. 3 depicts a module that may implement delivery of web page content resulting from in-line editing of web page content with reduced disruption of logical and presentational structure of content, according to some embodiments.

FIG. 3 depicts a module that may implement delivery of web page content resulting from in-line editing of web page content with reduced disruption of logical and presentational structure of content, according to some embodiments. Prospective purchaser interface module 320 may, for example, implement an online publishing tool, a web server, or a mobile device application. FIG. 11 illustrates an example computer system on which embodiments of prospective purchaser interface module 320 may be implemented. Prospective purchaser interface module 320 receives as input web page presentation data 350 from a page content data store 330 and business transaction data 360 from an inventory and accounting data store 340. In other embodiments, a web page may be delivered as a single document or documents from a single data store, rather than multiple documents or documents from multiple datastores, as shown. Prospective purchaser interface module 320 may receive user input 312 activating an online publishing tool, a web server, or a mobile device application. An example of user input 312 might be a request for transmission of an electronic commerce web page 310 or a request to create an electronic transaction.

Prospective purchaser interface module 320 then combines web page presentation data 350 from a page content data store 330 and business transaction data 360 from an inventory and accounting data store 340, according to user input 312 received via user interface 322, and prepares transmission of an electronic commerce webpage 310. The user may provide further input, to create a transaction or to request transmission of another web page. Prospective purchaser interface module 320 may, for example, store user input 312 to inventory and accounting data store 345, for example to record a transaction.

In some embodiments, prospective purchaser interface module 320 transmits to the prospective purchaser of goods the electronic commerce web page 310. In some embodiments, the transmitting to the prospective purchaser of goods the electronic commerce web page 310 includes transmitting the business transaction data 360 from the inventory and accounting data store 340, and the web page presentation data 350 from the page content data store 330. In some embodiments, prospective purchaser interface module 320, responsive to the prospective purchaser issuing a transaction instruction as user input 312 through the electronic commerce web page, receives a transaction order based at least in part on an entry of business transaction data 360 in the inventory and accounting data store 340.

Example of Improved Web Page Content Using Implement in-Line Editing of Web Page Content with Reduced Disruption of Logical and Presentational Structure of Content FIG. 4A is an example of a web page formatted for editability. Web page 400 contains content 402.

FIG. 4B is an example of a web page content adjusted for editability using structural tags. Web page 404 contains content 406 that is dwarfed by structural tags 408-410 inserted to provide automated editability, which alter the tree of HTML content by inserting additional tags, obscure the readability of the HTML code, and interfere with functions such as themes.

FIG. 4C is an example of a web page content adjusted for editability using a process for in-line editing of web page content with reduced disruption of logical and presentational structure of content, according to some embodiments. Web page 412 contains content 414 and a lightweight attribute 416 describing editability. The attributes 416 are key-value metadata inserted into editable parts of the document. The approach illustrated in FIG. 4C is superior to the approach shown in FIG. 4B in that no extra structural tags are inserted, thereby preserving readability and providing for a simpler HTML structure able to accommodate themes.

Figure 5A:
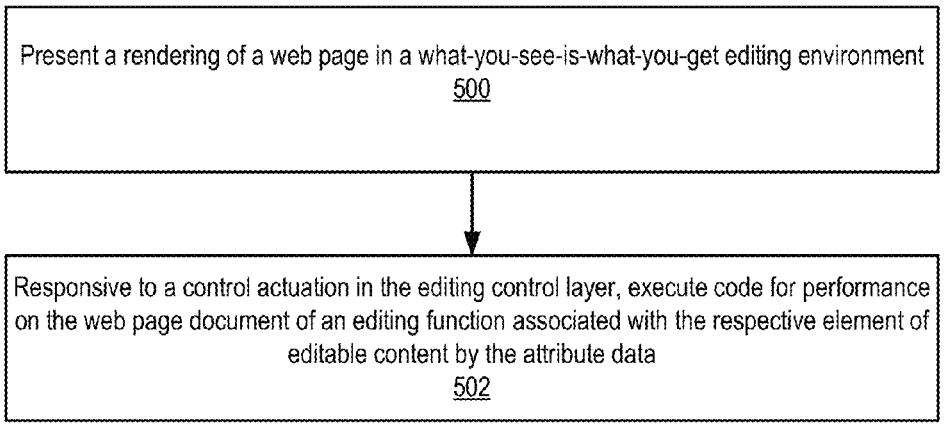
FIG. 5A is a flowchart of a process for in-line editing of web page content with reduced disruption of logical and presentational structure of content, according to some embodiments.

Example Operations Usable for in-Line Editing of Web Page Content with Reduced Disruption of Logical and Presentational Structure of Content FIG. 5A is a flowchart of a process for in-line editing of web page content with reduced disruption of logical and presentational structure of content, according to some embodiments. A rendering of a web page is presented in a what-you-see-is-what-you-get editing environment (block 500). Responsive to a control actuation in the editing control layer, code is executed for performance on the web page document of an editing function associated with the respective element of editable content by the attribute data (block 502).

Figure 5B:
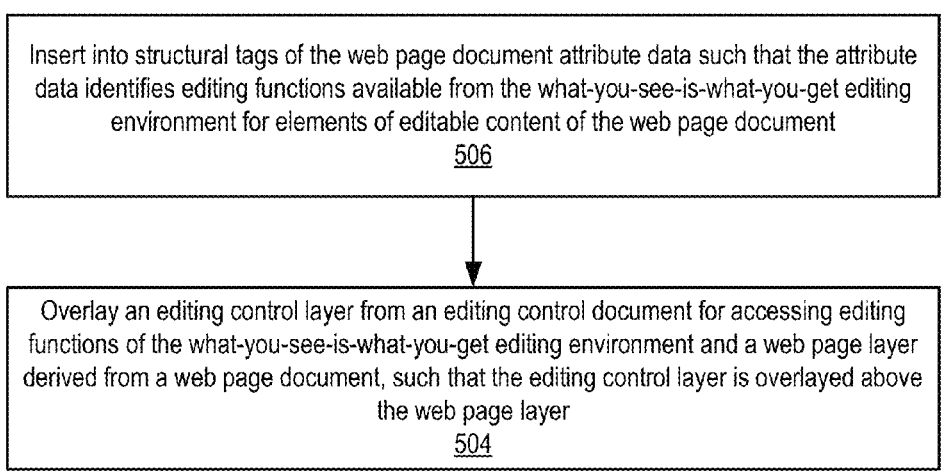
FIG. 5B is a flowchart of operations for presenting a rendering of a web page in a what-you-see-is-what-you-get editing environment for in-line editing of web page content with reduced disruption of logical and presentational structure of content, according to some embodiments.

FIG. 5B is a flowchart of operations for presenting a rendering of a web page in a what-you-see-is-what-you-get editing environment for in-line editing of web page content with reduced disruption of logical and presentational structure of content, according to some embodiments. Attribute data is inserted into structural tags of the web page document such that the attribute data identifies editing functions available from the what-you-see-is-what-you-get editing environment for elements of editable content of the web page document (block 504). An editing control layer from an editing control document for accessing editing functions of the what-you-see-is-what-you-get editing environment is overlayed with a web page layer derived from a web page document, such that the editing control layer is overlayed above the web page layer (block 506).

FIG. 5C is a flowchart of a process for in-line editing of electronic commerce web page content with reduced disruption of logical and presentational structure of content, according to some embodiments. A rendering of an electronic commerce web page in a what-you-see-is-what-you-get editing environment is presented to an administrator (block 510). Responsive to receiving an administrator edit of one of the elements of editable content from the what-you-see-is-what-you-get editing environment via the editing control layer, code is executed for performance on the electronic commerce web page document of an editing function associated with the respective element of editable content by the attribute data (block 512).

FIG. 5D is a flowchart of operations for presenting a rendering of an electronic commerce web page in a what-you-see-is-what-you-get editing environment for in-line editing of electronic commerce web page content with reduced disruption of logical and presentational structure of content, according to some embodiments. Attribute data is inserted into structural tags of the electronic commerce web page document such that the attribute data identifies editing functions available from the what-you-see-is-what-you-get editing environment for elements of editable content of the electronic commerce web page document (block 514). The electronic commerce web page is rendered in the what-you-see-is-what-you-get environment as viewable in presenting to a prospective purchaser (block 516). An editing control layer from an editing control document for accessing editing functions of the what-you-see-is-what-you-get editing environment and an electronic commerce web page layer derived from an electronic commerce web page document are overlayed, such that the editing control layer is overlayed above the electronic commerce web page layer (block 518).

Figure 6A:
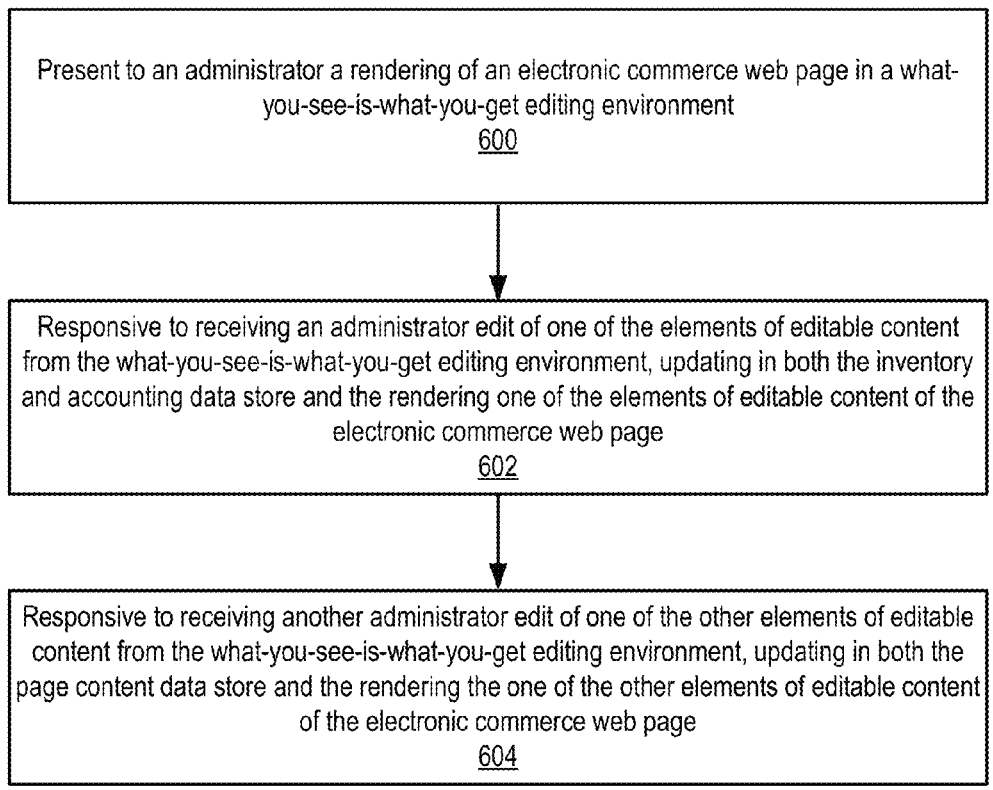
FIG. 6A is a flowchart of a process for in-line editing of web page content stored in multiple data stores, according to some embodiments.

Example Operation of User Interface Implementing in-Line Editing of Web Page Content Stored in Multiple Data Stores FIG. 6A is a flowchart of a process for in-line editing of web page content stored in multiple data stores, according to some embodiments. A rendering of an electronic commerce web page in a what-you-see-is-what-you-get editing environment is presented to an administrator (block 600). Responsive to receiving an administrator edit of one of the elements of editable content from the what-you-see-is-what-you-get editing environment, one of the elements of editable content of the electronic commerce web page is updated in both the inventory and accounting data store and the rendering (block 602). Responsive to receiving another administrator edit of one of the other elements of editable content from the what-you-see-is-what-you-get editing environment, the one of the other elements of editable content of the electronic commerce web page is updated in both the page content data store and the rendering (block 504).

Figure 6B:
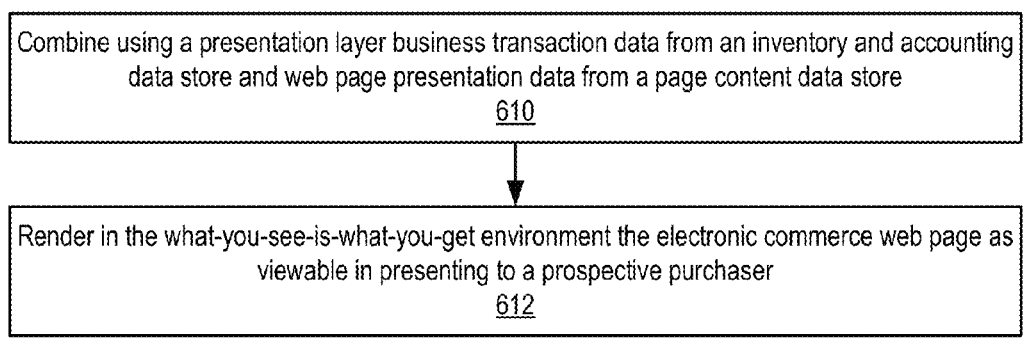
FIG. 6B is a flowchart of a process for presenting a rendering of an electronic commerce web page in a what-you-see-is-what-you-get environment for in-line editing of web page content stored in multiple data stores, according to some embodiments.

FIG. 6B is a flowchart of a process for presenting a rendering of an electronic commerce web page in a what-you-see-is-what-you-get environment for in-line editing of web page content stored in multiple data stores, according to some embodiments. Business transaction data from an inventory and accounting data store and web page presentation data from a page content data store are combined using a presentation layer (block 610). The electronic commerce web page is rendered in the what-you-see-is-what-you-get environment as viewable in presenting to a prospective purchaser (block 612).

Figure 6C:
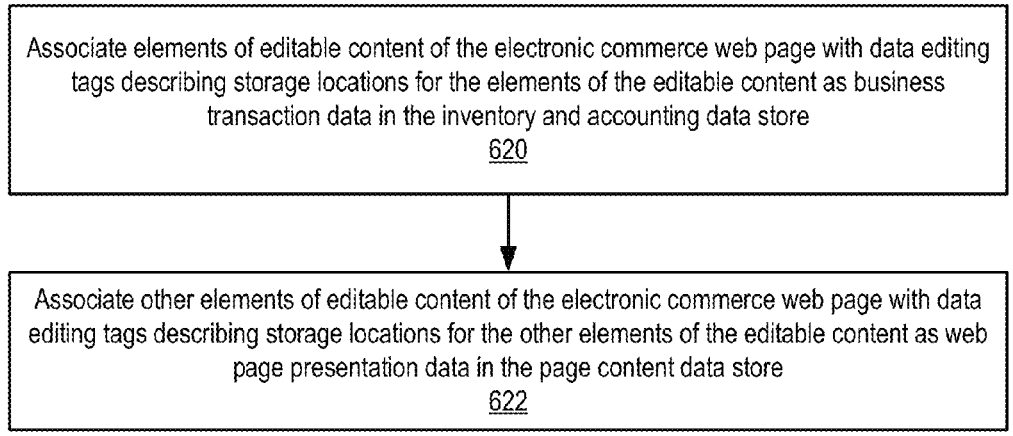
FIG. 6C is a flowchart of a process for combining web page content stored in multiple data stores for in-line editing of web page content stored in multiple data stores, according to some embodiments.

FIG. 6C is a flowchart of a process for combining web page content stored in multiple data stores for in-line editing of web page content stored in multiple data stores, according to some embodiments. Elements of editable content of the electronic commerce web page are associated with data editing tags describing storage locations for the elements of the editable content as business transaction data in the inventory and accounting data store (block 620). Other elements of editable content of the electronic commerce web page are associated with data editing tags describing storage locations for the other elements of the editable content as web page presentation data in the page content data store (block 622).

Figure 7:
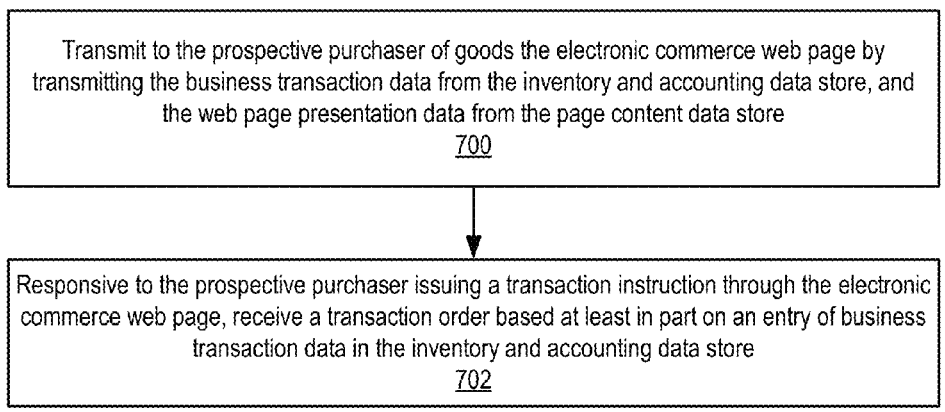
FIG. 7 is a flowchart of a process presenting to a prospective purchaser an electronic commerce web page edited in a what-you-see-is-what-you-get environment for in-line editing of web page content stored in multiple data stores, according to some embodiments.

FIG. 7 is a flowchart of a process presenting to a prospective purchaser an electronic commerce web page edited in a what-you-see-is-what-you-get environment for in-line editing of web page content stored in multiple data stores, according to some embodiments. The electronic commerce web page is transmitted to the prospective purchaser of goods by transmitting the business transaction data from the inventory and accounting data store, and the web page presentation data from the page content data store (block 700). Responsive to the prospective purchaser issuing a transaction instruction through the electronic commerce web page, a transaction order based at least in part on an entry of business transaction data in the inventory and accounting data store is received (block 702).

Figure 8:
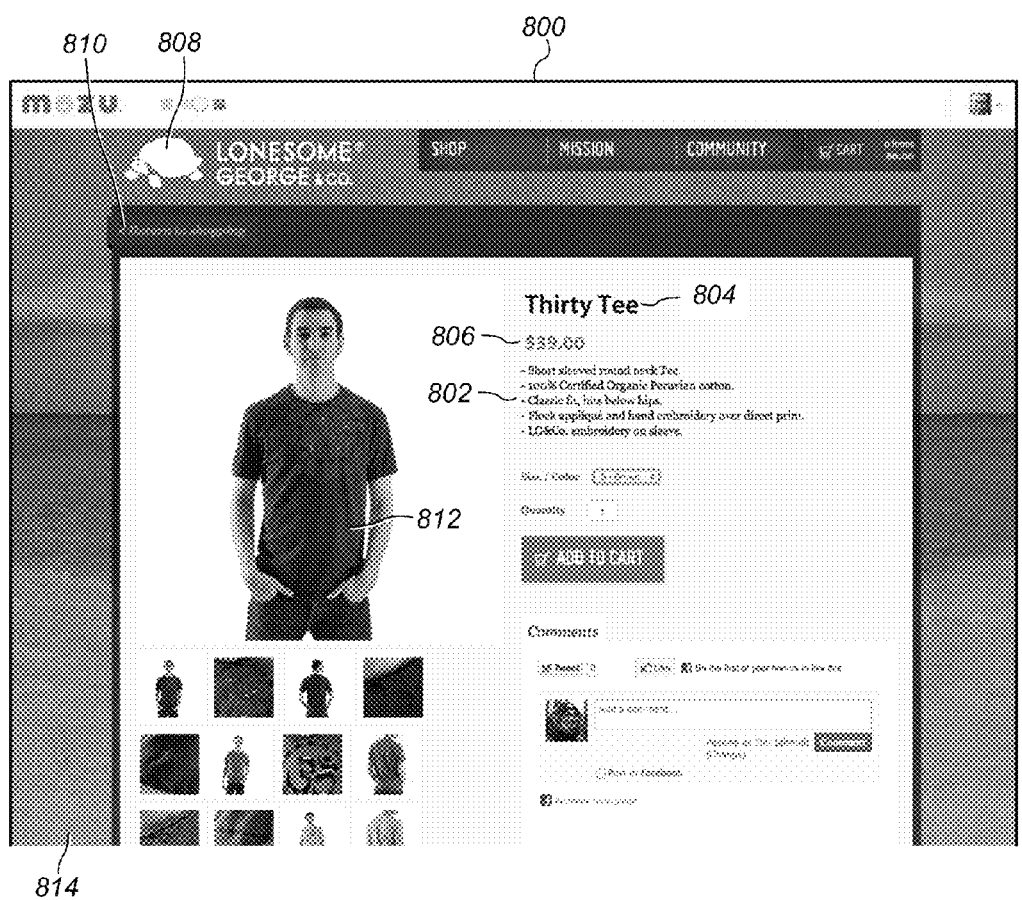
FIG. 8 depicts a user interface that may implement in-line editing of web page content with reduced disruption of logical and presentational structure of content, according to some embodiments.

Example Operation of User Interface Implementing in-Line Editing of Web Page Content with Reduced Disruption of Logical and Presentational Structure of Content FIG. 8 depicts a user interface that may implement in-line editing of web page content with reduced disruption of logical and presentational structure of content, according to some embodiments. A rendering of an electronic commerce web page in a what-you-see-is-what-you-get editing environment 800 is shown. The rendering of the electronic commerce web page in the what-you-see-is-what-you-get editing environment 800 includes an item description 802, an item name 804, and a price 806. Each of item description 802, item name 804, and price 806 is an item of business transaction data from an inventory and accounting data store. Each of item description 802, item name 804, and price 806 is likewise editable content of the electronic commerce web page. The rendering of the electronic commerce web page in the what-you-see-is-what-you-get editing environment 800 further includes logo art 808, a navigation control 810, an item presentation graphic 812, and a background graphic 814. Each of logo art 808, navigation control 810, item presentation graphic 812, and background graphic 814 is an item of web page presentation data from a page content data store. Each of logo art 808, navigation control 810, item presentation graphic 812, and background graphic 814 is likewise editable content of the electronic commerce web page.

Figure 9:
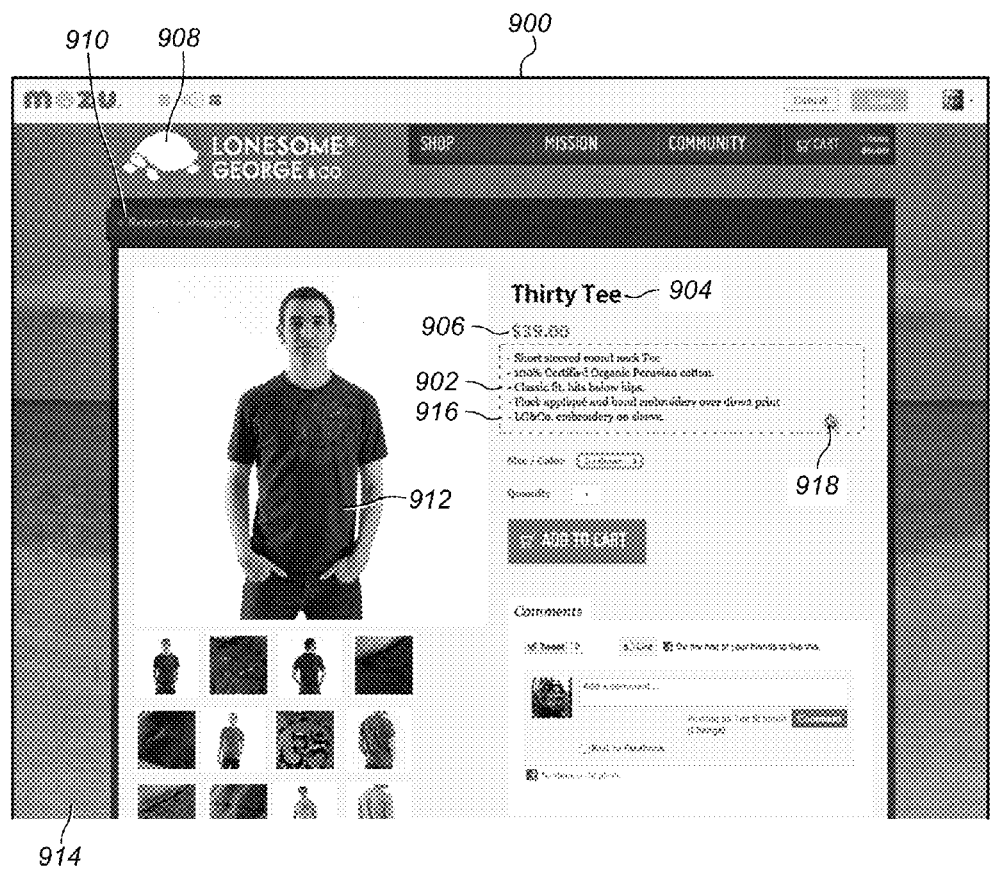
FIG. 9 illustrates a user interface that may implement in-line editing of web page content with reduced disruption of logical and presentational structure of content, according to some embodiments.

FIG. 9 illustrates a user interface that may implement in-line editing of web page content with reduced disruption of logical and presentational structure of content, according to some embodiments. A rendering of an electronic commerce web page in a what-you-see-is-what-you-get editing environment 900 is shown. The rendering of the electronic commerce web page in the what-you-see-is-what-you-get editing environment 900 includes an item description 902, an item name 904, and a price 906. Each of item description 902, item name 904, and price 906 is an item of business transaction data from an inventory and accounting data store. Each of item description 902, item name 904, and price 906 is likewise editable content of the electronic commerce web page. The rendering of the electronic commerce web page in the what-you-see-is-what-you-get editing environment 900 further includes logo art 908, a navigation control 910, an item presentation graphic 912, and a background graphic 914. Each of logo art 908, navigation control 910, item presentation graphic 912, and background graphic 914 is an item of web page presentation data from a page content data store. Each of logo art 908, navigation control 910, item presentation graphic 912, and background graphic 914 is likewise editable content of the electronic commerce web page.

For each of item description 902, item name 904, price 906, logo art 908, navigation control 910, item presentation graphic 912, and background graphic 914, an editing control layer from an editing control document for accessing editing functions of the what-you-see-is-what-you-get editing environment is overlayed above a web page layer derived from a web page document. An example of such a control is ability to delete content 916 from item description 902 by performing a selection gesture 918. The ability to provide the editing controls is accomplished by inserting into structural tags of the web page document attribute data. The attribute data identifies editing functions available from the what-you-see-is-what-you-get editing environment for elements of editable content of the web page document, such as item description 902, item name 904, price 906, logo art 908, navigation control 910, item presentation graphic 912, and background graphic 914. Responsive to a control actuation in the editing control layer, such as selection gesture 918, code is executed for performance on the web page document of an editing function associated with the respective element of editable content by the attribute data. An example of such an operation is described below with respect to FIG. 10.

Figure 10:
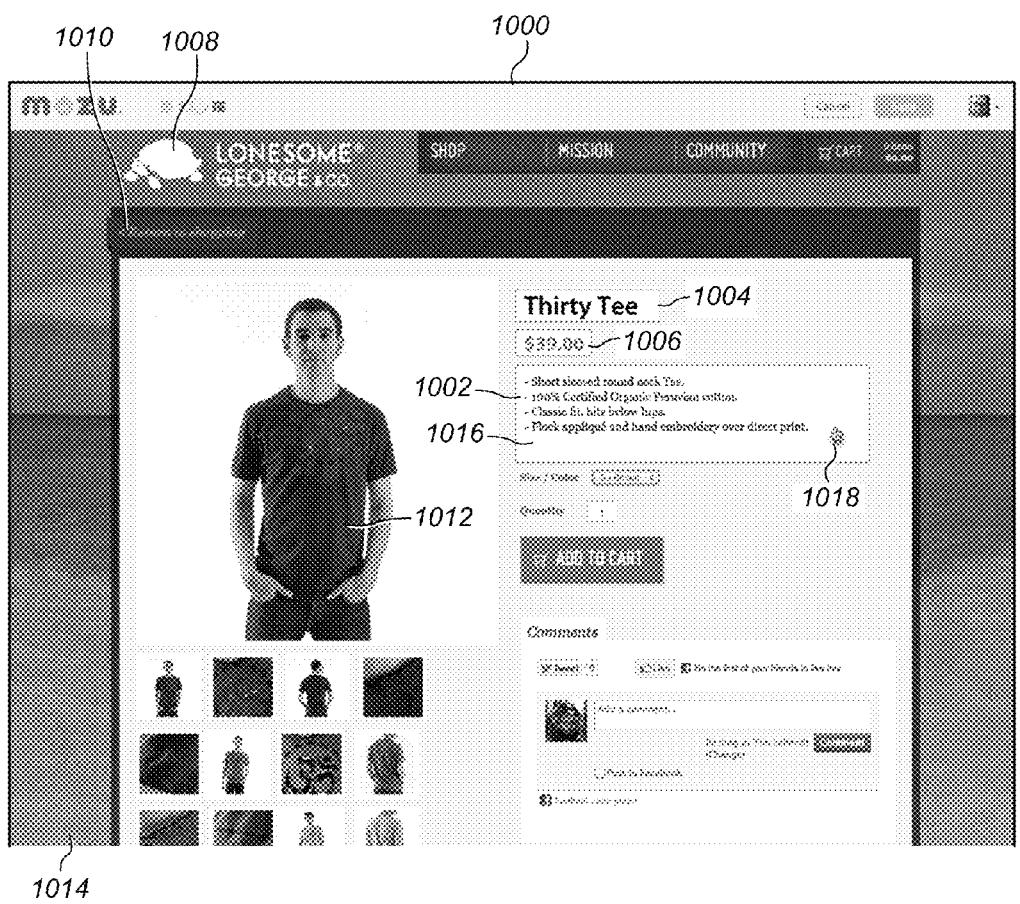
FIG. 10 depicts a user interface that may implement in-line editing of web page content with reduced disruption of logical and presentational structure of content, according to some embodiments.
Figure 11:
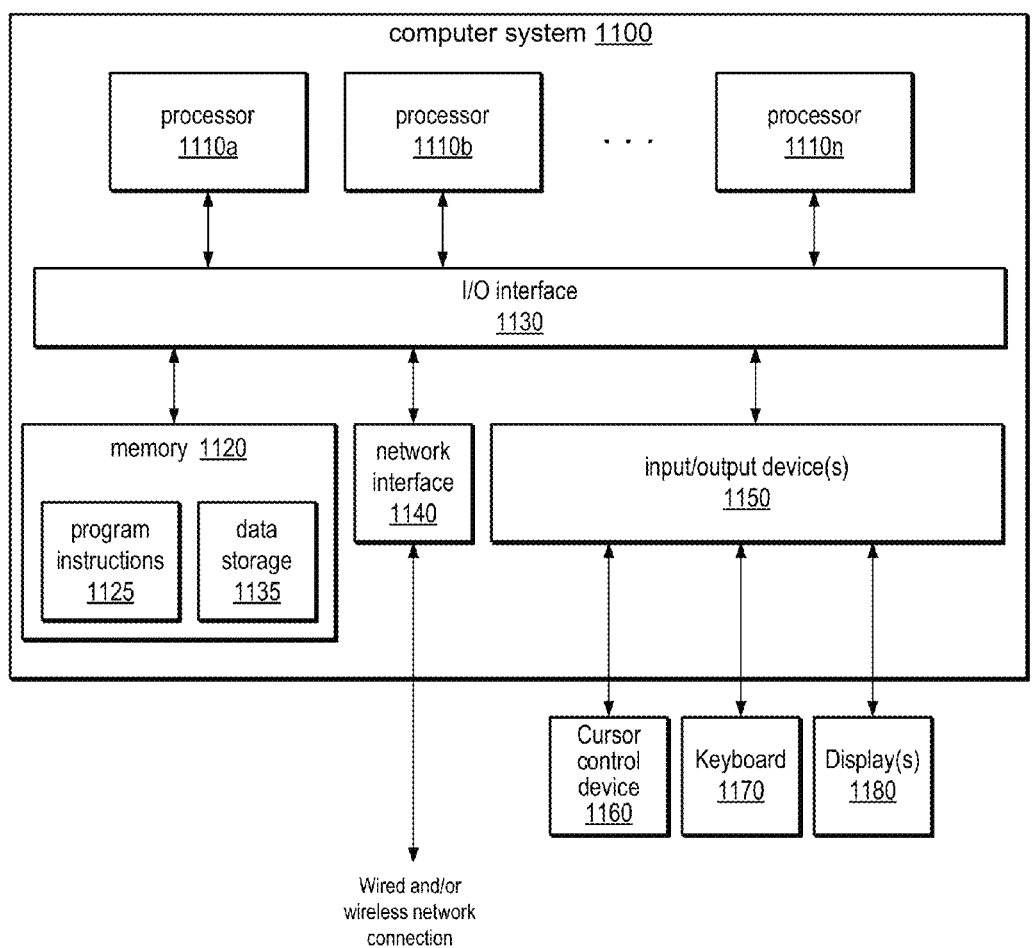
FIG. 11 depicts an example computer system that may be used in embodiments.

FIG. 10 depicts a user interface that may implement in-line editing of web page content with reduced disruption of logical and presentational structure of content, according to some embodiments. A rendering of an electronic commerce web page in a what-you-see-is-what-you-get editing environment 1000 is shown. The rendering of the electronic commerce web page in the what-you-see-is-what-you-get editing environment 1000 includes an item description 1002, an item name 1004, and a price 1006. Each of item description 1002, item name 1004, and price 1006 is an item of business transaction data from an inventory and accounting data store. Each of item description 1002, item name 1004, and price 1006 is likewise editable content of the electronic commerce web page. The rendering of the electronic commerce web page in the what-you-see-is-what-you-get editing environment 1000 further includes logo art 1008, a navigation control 1010, an item presentation graphic 1012, and a background graphic 1014. Each of logo art 1008, navigation control 1010, item presentation graphic 1012, and background graphic 1014 is an item of web page presentation data from a page content data store. Each of logo art 1008, navigation control 1010, item presentation graphic 1012, and background graphic 1014 is likewise editable content of the electronic commerce web page.

An empty space 1016 is indicated, where content was deleted from item description 1002 using pointer 1018. Responsive to a control actuation using pointer 1018, in the editing control layer, code was executed for performance on the web page document of an editing function associated with the respective element of editable content by the attribute data, to create empty space 1016.

Example System

Embodiments of an in-line editing module, an electronic commerce hosting environment and/or of the various web page editing techniques as described herein may be executed on one or more computer systems, which may interact with various other devices. One such computer system is illustrated by FIG. 11. In different embodiments, computer system 1100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. In some embodiments, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

In some embodiments, at least one processor 1110 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1120 may be configured to store program instructions and/or data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a in-line editing module or an electronic commerce hosting environment are shown stored within system memory 1120 as program instructions 1125 and data storage 1135, respectively. In other embodiments, program instructions and/or data may be received, sent or stored upon different types of computer-accessible media or on similar media separate from system memory 1120 or computer system 1100. Generally speaking, a computer-accessible medium may include storage media or memory media such as magnetic or optical media, e.g., disk or CD/DVD-ROM coupled to computer system 1100 via I/O interface 1130. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1140.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. In addition, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network, such as other computer systems, or between nodes of computer system 1100. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computer system 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1125, configured to implement embodiments of an in-line editing module or an electronic commerce hosting environment as described herein, and data storage 1135, comprising various data accessible by program instructions 1125. In one embodiment, program instructions 1125 may include software elements of embodiments of a an in-line editing module or an electronic commerce hosting environment as illustrated in the above Figures. Data storage 1135 may include data that may be used in embodiments. In other embodiments, other or different software elements and data may be included.

Those skilled in the art will appreciate that computer system 1100 is merely illustrative and is not intended to limit the scope of a an in-line editing module or an electronic commerce hosting environment as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   causing one or more processors to perform:
   presenting a rendering of a web page in a what-you-see-is-what-you-get editing environment, wherein the presenting comprises:
   combining transaction data from a data store and web page presentation data from a page content data store
   rendering in the what-you-see-is-what-you-get editing environment the web page as the web page would be viewed in a non-editing viewing environment in a browser, and
   transmitting to a browser application of an administrator the rendering of the web page in the what-you-see-is-what-you-get editing environment as:
   an editing code layer for providing editing functions of the what-you-see-is-what-you-get editing environment, and
   an electronic commerce web page layer including attribute tags identifying locations for editing options and excluding executable code for the what-you-see-is-what-you-get editing environment
   responsive to receiving from the what-you-see-is-what-you-get editing environment and edit of an element of editable content of the web page, updating in both the transaction data store and the rendering the element of editable content of the web page.

2. The method of claim 1, wherein:
   the presenting excludes inserting tags that alter structures of the web page for use in editing in the what-you-see-is-what-you-get editing environment, and
   the presenting further comprises rendering in the what-you-see-is-what-you-get the web page as viewable in presenting to a prospective purchaser.

3. The method of claim 1, wherein the presenting further comprises preparing for display in an inline frame of the what-you-see-is-what-you-get editing environment of the web page.

4. The method of claim 1, wherein the presenting further comprises preparing for display in an inline frame of the what-you-see-is-what-you-get editing environment the web page such that a browser performing the display ignores attributes in the attribute tags as metadata.

5. The method of claim 1, wherein the presenting further comprises:
   retrieving attributes from a web page document, and
   displaying editing function controls of an editing control document as identified by the attributes as an overlay over an inline from of the what-you-see-is-what-you-get editing environment.

6. The method of claim 5, wherein the attributes are key-value metadata inserted into editable parts of the web page document.

7. The method of claim 1, wherein:
   the presenting does not include inserting tags that alter structures of the web page for use in editing in the what-you-see-is-what-you-get editing environment, and
   responsive to receiving the edit of the element of editable content from the what-you-see-is-what-you-get editing environment, executing code for performance, on the web page, of an editing function associated with the element of editable content.

8. A system, comprising:
   at least one processor; and
   a memory comprising program instructions, wherein the program instructions are executable by the at least one processor to:
   present a rendering of a web page in a what-you-see-is-what-you-get editing environment, wherein the program instructions executable by the at least one processor to present comprise program instructions executable by the at least one processor to:
   combine transaction data from a transaction data store and web page presentation data from a page content data store
   render in the what-you-see-is-what-you-get editing environment the web page as the web page would be viewed in a non-editing viewing environment in a browser,
   transmit to a browser application of an administrator the rendering of the web page in the what-you-see-is-what-you-get editing environment as:
   an editing code layer for providing editing functions of the what-you-see-is-what-you-get editing environment, and
   an electronic commerce web page layer including attribute tags identifying locations for editing options and excluding executable code for the what-you-see-is-what-you-get editing environment; and
   responsive to receipt from the what-you-see-is-what-you-get editing environment of an edit of an element of editable content of the web page, update in both the transaction data store and the rendering the element of editable content of the web page.

9. The system of 8, wherein the program instructions executable by the at least one processor to present further comprise program instructions executable by the at least one processor to present further comprise program instructions executable by the at least one processor to prepare for display in an inline from of the what-you-see-is-what-you-get editing environment the web page.

10. The system of claim 8, wherein the program instructions executable by the at least one processor to present further comprise program instructions executable by the at least one processor to present further comprise program instructions executable by the at least one processor to prepare for display in an inline from of the what-you-see-is-what-you-get editing environment the web page such that a browser performing the displaying ignores attributes in the attribute tags as metadata.

11. The system of claim 8, wherein the program instructions executable by the at least one processor to present further comprise program instructions executable by the at least one processor to:
  retrieve attributes from a web page document, and
  display editing function controls of an editing control document as identified by the attributes as an overlay over an inline from of the what-you-see-is-what-you-get editing environment.

12. The system of claim 11, wherein the attributes are key-value metadata inserted into editable parts of the web page document.

13. The system of claim 8, wherein
  the program instructions executable by the at least one processor to present do not include program instructions executable by the at least one processor to insert tags that alter structures of the web page for use in editing in the what-you-see-is-what-you-get editing environment, and wherein
  responsive to receipt of the edit of the element of editable content of the web page from the what-you-see-is-what-you-get editing environment, the program instructions executable by the at least one processor to present further comprise program instructions executable by the at least one processor to perform, on the web page, an editing function associated with the element of editable content.

14. The system of claim 8, wherein the program instructions executable by the at least one processor to present further comprise program instructions executable by the at least one processor to insert tags that alter a tree of HTML content.

15. A non-transitory computer-readable storage medium storing computer-executable program instructions that, when executed by one or more processors, cause the one or more processors to:
  present a rendering of a web page in a what-you-see-is-what-you-get editing environment, wherein to present, the computer-executable program instructions, when executed, cause the one or more processors to:
    combine transaction data from a transaction data store and web page presentation data from a page content data store,
    render in the what-you-see-is-what-you-get editing environment the web page as the web page would be viewed in a non-editing viewing environment in a browser, and
    transmitting to a browser application of an administrator the rendering of the web page in the what-you-see-is-what-you-get editing environment as:
      an editing code layer for providing editing functions of the what-you-see-is-what-you-get editing environment, and
      an electronic commerce web page layer including attribute tags identifying locations for ending options and excluding executable code for the what-you-see-is-what-you-get editing environment; and
    responsive to receipt from the what-you-see-is-what-you-get editing environment of an edit of an element of editable content of the web page, update in both the transaction data store and the rendering the element of editable content of the web page.

16. The non-transitory computer-readable storage medium of claim 15, wherein to present, the computer-executable program instructions, when executed, further cause the one or more processors to prepare for display in an inline from of the what-you-see-is-what-you-get editing environment the web page.

17. The non-transitory computer-readable storage medium of claim 15, wherein to present, the computer-executable program instructions, when executed, further cause the one or more processors to prepare for display in an inline from of the what-you-see-is-what-you-get editing environment the web page such that a browser performing the display ignores the attributes as metadata.

18. The non-transitory computer-readable storage medium of claim 15, wherein to present, the computer-executable program instructions, when executed, further cause the one or more processors to:
  retrieve attributes from a web page document, and
  display editing function controls of an editing control document as identified by the attributes as an overlay over an inline from of the what-you-see-is-what-you-get editing environment.

19. The non-transitory computer-readable storage medium of claim 18, wherein the attributes are key-value metadata inserted into editable parts of the web page document.

20. The non-transitory computer-readable storage medium of claim 15, wherein responsive to the receipt of the edit of the element of editable content from the what-you-see-is-what-you-get editing environment via the editing control layer, the computer-executable program instructions, when executed, further cause the one or more processors to insert tags that alter structures of the web page for use in editing in the what-you-see-is-what-you-get editing environment.

21. The non-transitory computer-readable storage medium of claim 20, wherein to insert the tags that alter structures of the web page for use in editing in the what-you-see-is-what-you-get editing environment, the computer-executable program instructions, when executed, further cause the one or more processors to insert tags that alter a tree of HTML content.

22. The non-transitory computer-readable storage medium of claim 15, wherein to present, the computer-executable program instructions, when executed further cause the one or more processors to implement overlaying:
  an editing control layer from an editing control document for accessing editing functions of the what-you-see-is-what-you-get editing environment, and
  an electronic commerce web page layer derived from an electronic commerce web page document, wherein
  the editing control layer is overlayed above the electronic commerce web page layer.

* * * * *

UNITED STATES PATENT AND TRADEMARK OFFICE
CERTIFICATE OF CORRECTION

PATENT NO.       : 10,013,400 B1
APPLICATION NO.  : 13/962411
DATED            : July 3, 2018
INVENTOR(S)      : James Zetlen It is certified that error appears in the above-identified patent and that said Letters Patent is hereby corrected as shown below:

In the Specification

In. Column 4, Line 2, Change "the a" to --the--

In the Claims

In Column 23, Line 39, Claim 1, change "a" to --a transaction--

In Column 23, Line 40, Claim 1, change "store" to --store,--

In Column 23, Lines 54-55, Claim 1, change "environment" to --environment; and--

In Column 23, Line 57, Claim 1, change "and" to --an--

In Column 23, Line 66, Claim 2, change "the" to --environment the--

In Column 24, Line 3, Claim 3, change "of the" to --the--

In Column 24, Line 8, Claim 4, change "display" to --displaying--

In Column 24, Line 15, Claim 5, change "from" to --frame--

In Column 24, Line 25, Claim 7, change "to" to --to the--

In Column 24, Line 42, Claim 8, change "store" to --store,--

In Column 24, Line 46, Claim 8, change "browser," to --browser, and--

In Column 24, Line 63, Claim 9, change "system of" to --system of claim--

Signed and Sealed this
Twelfth Day of February, 2019

Andrei Iancu
*Director of the United States Patent and Trademark Office*

CERTIFICATE OF CORRECTION (continued)
U.S. Pat. No. 10,013,400 B1

In Column 24, Lines 66-67, Claim 9, change "to present further comprise program instructions executable by the at least one processor to prepare" to --to prepare--

In Column 25, Line 1, Claim 9, change "from" to --frame--

In Column 25, Lines 6-8, Claim 10, change "to present further comprise program instructions executable by the at least one processor to prepare" to --to prepare--

In Column 25, Line 8, Claim 10, change "from" to --frame--

In Column 25, Line 19, Claim 11, change "from" to --frame--

In Column 25, Line 59, Claim 15, change "transmitting" to --transmit--

In Column 26, Line 2, Claim 15, change "ending" to --editing--

In Column 26, Line 15, Claim 16, change "from" to --frame--

In Column 26, Line 21 (Approx.), Claim 17, change "from" to --frame--

In Column 26, Line 23 (Approx.), Claim 17, change "display" to --displaying--

In Column 26, Line 31, Claim 18, change "from" to --frame--

In Column 26, Line 55, Claim 22, change "executed" to --executed,--